Sept. 30, 1952 S. T. CARTER 2,612,254
CONVEYER MECHANISM
Filed Sept. 14, 1945 4 Sheets-Sheet 1
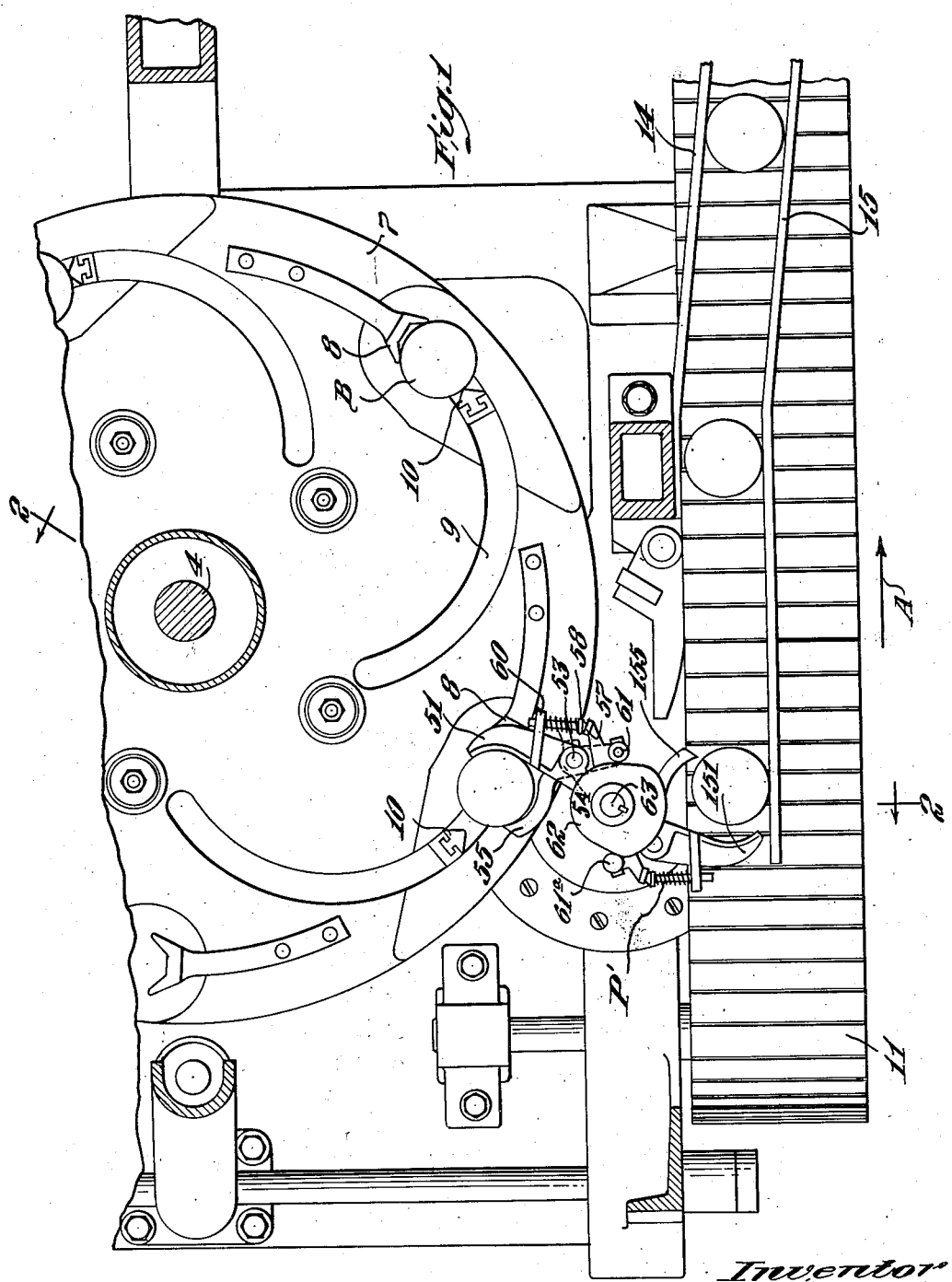
Inventor
Sidney T. Carter
by Robert Cushman Grover
Attys.

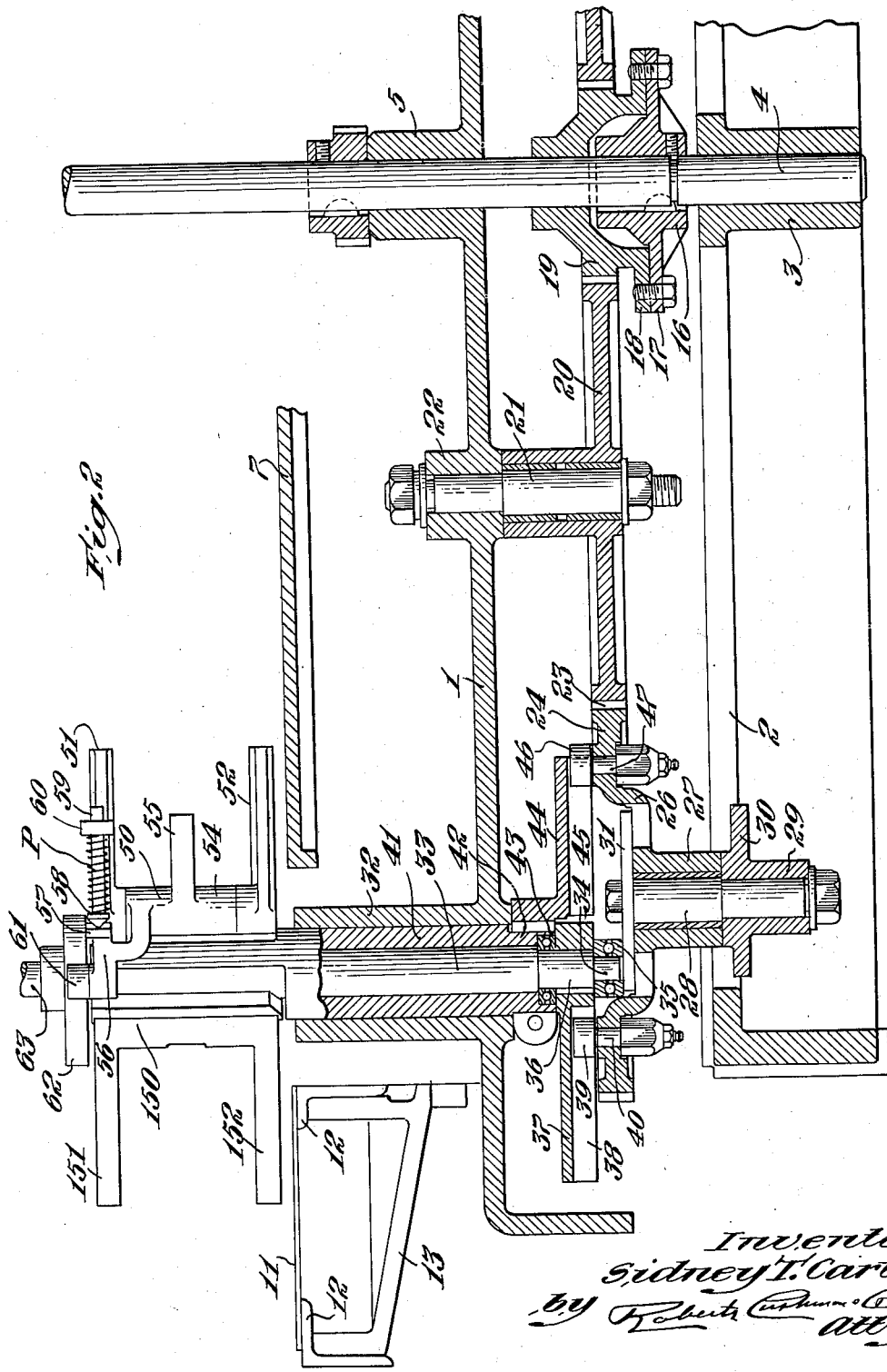

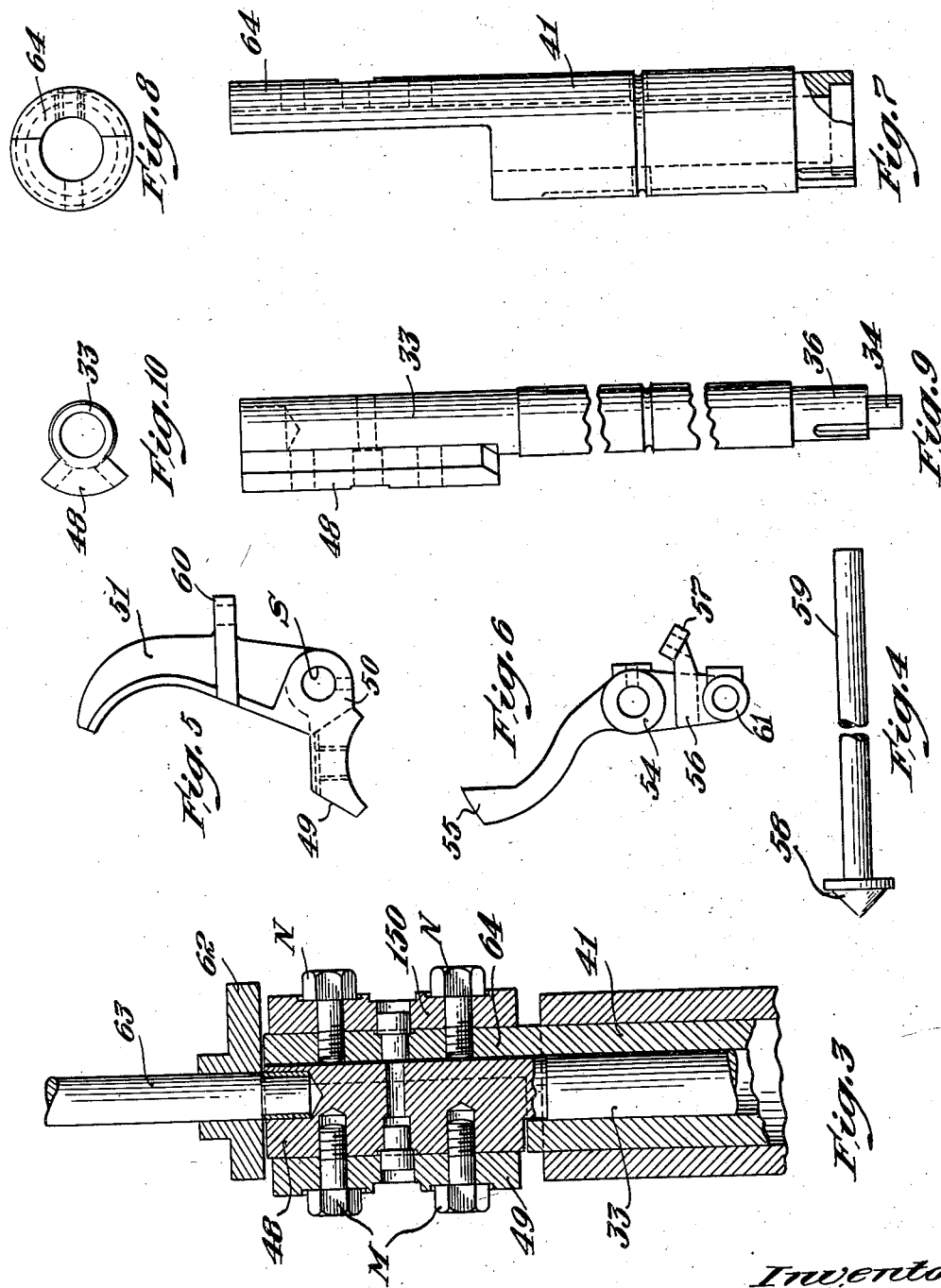

Sept. 30, 1952  S. T. CARTER  2,612,254
CONVEYER MECHANISM
Filed Sept. 14, 1945  4 Sheets-Sheet 4

Inventor
Sidney T. Carter
by Roberts Cushman & Grover
Att'ys.

Patented Sept. 30, 1952

2,612,254

UNITED STATES PATENT OFFICE 2,612,254

CONVEYER MECHANISM

Sidney T. Carter, Worcester, Mass., assignor, by mesne assignments, to Geo. J. Meyer Manufacturing Co., Cudahy, Wis., a corporation of Wisconsin Application September 14, 1945, Serial No. 616,319

17 Claims. (Cl. 198—22)

This invention pertains to conveyor mechanism and relates more especially to improved means for delivering moving articles from one conveyor element to another, in particular for delivering articles, which are being moved by a conveyor at a given linear speed and along one path, to a second conveyor which moves them along a different path at a substantially different speed. For specific example of one utility of the invention it may be employed in a labeling machine wherein an article is supported, while receiving the label, by a rotary turntable and must then be transferred to a conveyor belt or chain which defines a path tangent (or parallel to a tangent) to the rotary turntable, and which may, for example, convey the articles to a packaging machine.

In certain types of bottle labeling machine, for example a machine of the general kind disclosed in patents to Woodland No. 1,203,676, November 7, 1916, No. 1,138,855, October 13, 1914, and No. 1,133,602, March 30, 1915, the bottle is supported upon a table which turns about a vertical axis, the bottle being gripped between movable jaws which hold the bottle firmly in upright position while the label is being applied. These jaws are automatically separated to release the bottle at the point where it is to be delivered to the conveyor. At this point the bottle must be moved off of the rapidly turning table without interrupting the rotation of the latter and without danger of tipping the bottle, and deposited safely in upright position upon the conveyor chain or belt. During this transfer the motion of the bottle must be changed from a rapid movement of revolution to a much slower linear motion in a substantially rectilinear path. The principal object of the present invention is to provide automatic means operative to seize the article as it is released by the gripping jaws of the table and to deliver it safely to the conveyor belt or chain wherein it will stand upright without the assistance of any positive holding means.

One object of the present invention is to provide novel and effective means operative, automatically, to transfer an article from one conveyor to the other and which affords complete control of the article before and during the transfer. A further object is to provide transfer means so devised as, during the transfer, positively to vary the linear velocity of the article from that which it had while traveling on the first conveyor to one at which it may safely be delivered to the second conveyor. A further object is to provide automatic transfer means operative to transfer an article from a rotary conveyor to a rectilinear conveyor path while reducing its linear speed from that of the rotary conveyor to that at which it may safely initiate its motion along the rectilinear path. A further object is to provide automatic means operative to grasp the article, preparatory to its transfer from one conveyor element to the other, and to release it after it has been safely delivered onto the other conveyor element. A further object is to provide automatic means operative to seize an article as it is released by the clamping means of a rotary labeling machine table and to deliver it safely to a conveyor belt or chain in such a way that it will remain upright when so delivered without the assistance of any associated holding means. Other and further objects and advantages of the invention will be pointed out in the following more detailed description and by reference to the accompanying drawings wherein Fig. 1 is a fragmentary plan view partly in horizontal section and more or less diagrammatic in character, showing the improved transfer means of the present invention arranged to transfer articles, for instance bottles, from the rotary table of a labeling machine to a horizontal conveyor belt;

Fig. 2 is a fragmentary vertical section substantially on the line 2—2 of Fig. 1;

Fig. 3 is a fragmentary vertical section, to larger scale, showing portions of the driven shafts of the transfer mechanism, together with the stationary cam which controls the operation of the article-gripping jaws;

Fig. 4 is a fragmentary plan view of a jaw-actuating pin;

Fig. 5 is a plan view of one of the article-engaging arms of the transfer mechanism;

Fig. 6 is a plan view of the corresponding article-gripping jaw;

Fig. 7 is a side elevation, partly broken away, of one of the driven shafts of the transfer mechanism;

Fig. 8 is a plan view of the shaft of Fig. 7;

Fig. 9 is a fragmentary elevation of the other driven shaft of the transfer mechanism;

Fig. 10 is a plan view of the shaft of Fig. 9; and

Figure 11:
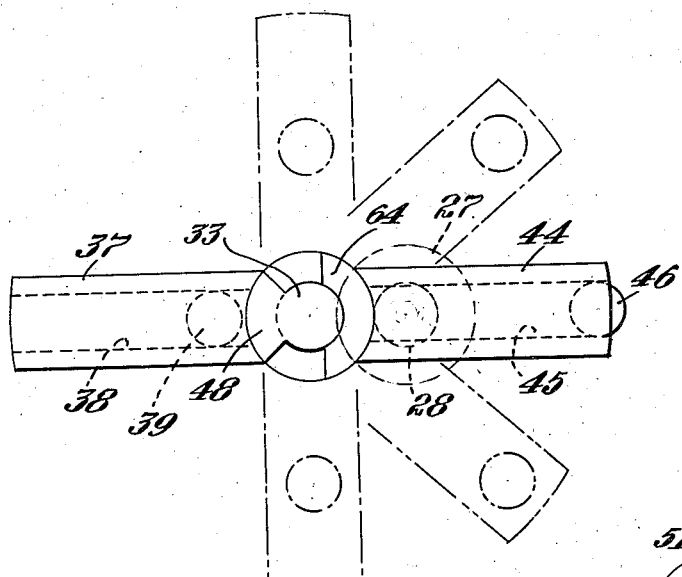

Figs. 11 to 16 inclusive are diagrammatic plan views illustrating the action of the transfer mechanism.

Referring to the drawings, the numeral 1 designates a horizontal frame member forming a portion of a machine, here indicated as a labeling machine, with which the improved transfer mechanism is associated. The frame also comprises a horizontal rail or rails 2, spaced below the frame member 1 and which support a lower bearing 3 for the shaft 4 on which the rotary conveyor element, for instance the rotary table 7, of a labeling machine, is mounted. A second bearing 5 for this shaft 4 is carried by the frame member 1. Drive connections (not shown) deliver power for turning the shaft 4 from some convenient rotating element of the labeling machine, for instance as illustrated in the Woodland patent referred to. The table 7 is a horizontal disk having a substantially plane upper surface upon which the articles (here illustrated, Fig. 1, as bottles B) rest, as they are moved past the label-applying mechanism, not here shown. This table is provided with a plurality of circumferentially spaced rear rests or pusher devices 8 (Fig. 1) which are of such horizontal width as to contact a substantial area of the bottle, and with corresponding arcuate slots 9 for guiding article-clamping elements or gripfingers 10 (disposed forwardly or in advance of the rest 8 in the direction of rotation) which cooperate with the rests 8 in holding the articles firmly in upright position as they are moved along by the rotary conveyor table. This table, with its rear or following rests 8 and its forward clamping members 10, and the means for relatively moving the rests and clamping members is of the general type disclosed in the patent to Woodland above referred to, and need not be further described herein, since these details form no essential part of the present invention. The articles to be labeled are delivered in any desired manner, either manually or by automatic means not herein shown, but common in the art, to the rotary conveyor element 7, and after receiving the labels, they are to be transferred to another conveyor element, here shown as an endless conveyor belt or chain 11, which, as illustrated in Fig. 1, is substantially parallel to a tangent to the periphery of the table 7, and with its upper run (Fig. 2) substantially in the same horizontal plane as the upper surface of the table 7. The upper run of this conveyor belt is supported by suitable guide means 12 carried by a portion 13 of the machine frame as illustrated in Fig. 2, the conveyor being driven in timed relation to the table 7 by appropriate drive connections familiar to those skilled in the art, but not shown. Preferably, there is associated with the conveyor 11, suitable guide means, here shown (Fig. 1) as comprising stationary spaced rails 14 and 15 for positioning the articles, after being deposited upon the belt or chain at a desired point widthwise of the chain, for example so as to facilitate the delivery of a second set of articles onto the same belt or chain by transfer mechanism corresponding to another labeling machine.

Referring to Fig. 2, the table-supporting shaft 4 is shown as provided with a hub member 16 keyed to the shaft and having a radial flange 17 which receives bolts which enter threaded openings in a radial flange 18 forming part of a pinion 19 loose on the shaft 4. The openings in the flange 17, which receive the attaching bolts, may be circumferentially elongate so as to permit accurate adjustment of the pinion 19 relatively to the shaft 4, if desired. The pinion 19 meshes with a gear 20 which turns on a stub shaft 21 fixed at its upper end in a hollow boss 22 carried by the frame member 1. This gear 20 meshes with teeth 23 on the rim 24 of a cupped gear 26 having a depressed central portion integral with a hollow drive shaft 27 which turns on the upper part of a stud 28 fixed at its lower end in a boss 29 supported by a portion 30 of the machine frame. To the upper end of the stud 28 there is secured a horizontal disk 31 having a plain smooth upper surface.

The frame member 1 is provided with an elongate tubular boss 32 whose axis is located between the periphery of the table 7 and the adjacent edge of the conveyor belt 11 and which is eccentric with respect to the axis of the hollow drive shaft 27. Within this sleeve 32 and coaxial therewith is the inner driven shaft 33 of the transfer device, said shaft having a reduced lower end 34 (Figs. 2 and 9) which turns in an anti-friction bearing device 35 resting on the smooth upper surface of the disk 31. Immediately above its reduced lower end 34, the shaft 33 has a portion 36 of somewhat larger diameter to which is clamped the hub portion of a rigid actuating arm 37 (Figs. 2 and 11) having a radially elongate guide slot 38 which receives a roll 39 turning on the upper end of a crank pin 40 secured to the horizontal rim portion 24 of the gear 26.

A second driven shaft 41 (Figs. 2, 7 and 8), whose lower portion is tubular and in which the shaft 33 turns, is disposed to turn within the tubular boss 32 and has a portion 42 at its lower end, of reduced diameter, which rests upon an anti-friction bearing device 43 which in turn rests upon the hub portion of the arm 37. The hub portion of a second rigid actuating arm 44 is clamped to the part 42 of the shaft 41 and is provided with an elongate radial guide slot 45 (Fig. 11) which receives a roll 46 turning on the upper end of a crank pin 47 fixed in the rim 24 of the gear 26. The pins 40 and 47 are 180° apart so that rolls 39 and 46 are diametrically opposed.

That portion of the inner shaft 33 which is exposed above the upper part of the bearing 32, is provided with a segmental projection 48 (Fig. 10) which, as here illustrated, is of substantially 45° circumferential extent. To the outer arcuate peripheral surface of this projection 48 there is attached, by means of bolts M or the like (Fig. 3), the hub portion 49 (Fig. 5) of an article-engaging arm 50 here shown (Fig. 2) as comprising vertically spaced upper and lower article-engaging arms or members 51 and 52, the parts being so arranged that, as the shaft 33 rotates, these article-engaging members 51 and 52 sweep over the marginal portion of the table 7 so as to intersect the normal circumferential path of the articles B traveling with the table 7. Preferably the article-engaging arms or members 51 and 52 are curved, as illustrated in Fig. 1, so as partially to embrace a bottle B as they come into contact with the upper and lower portions respectively of the latter.

The inner portions of the members 51 and 52 are provided with aligned openings S (Fig. 5) for a vertical shaft 53 (Fig. 1) which forms a pivotal support for the hub portion 54 of an article-gripping or clamping jaw 55 (Fig. 6). This jaw, as here illustrated, is located substantially midway, vertically, between the parts 51 and 52. The jaw 55 is provided with an upwardly extending bracket portion 56 (Figs. 2 and 6) having a projection 57 which receives the conical end 58 of a jaw-actuating pin (Figs. 1, 2 and 4) having a stem portion 59 sliding in an opening in a boss 60 projecting from the upper article-engaging member 51. A spring P, coiled about the stem 59, urges the conical head 58 of the pin into contact with the member 57, thus tending to swing the free end of the jaw 55 in a clockwise direction, as viewed in Fig. 1, so as to grip an article B between the gripper jaw 55 and the members 51 and 52.

The bracket 56 also carries an upstanding pin on which turns a cam follower roll 61 (Fig. 1) designed to engage a stationary cam 62 fast to a shaft 63 whose lower end is received in a socket bearing in the upper end of the inner driven shaft 33, and whose upper end is fixed in a bearing, not shown, carried by the machine frame.

That portion of the tubular driven shaft 41 which is exposed above the upper end of the sleeve bearing 32, is cut away so as to provide a segmental tubular portion 64 (Figs. 7 and 8), here shown as of a circumferential extent of approximately 140°, this portion 64 being at the opposite side of the axis of the shaft 41 from the projection 48 on the shaft on the shaft 33. Since the combined circumferential extent of the projection 48 on the shaft 33. Since the combined circumferential extent of the projection 48 and the segmental portion 64 is substantially less than 360°, it is thus possible for the inner and outer shafts to turn relatively to each other through a substantial arc.

The driving and controlling elements are so designed that the jaw 55 contacts the bottle before the latter is engaged by the arm 51. The bottle is held firmly against the rest 8 by the jaw 55 alone while the bottle is moving approximately ¼ inch along its arcuate path with the turntable, thus affording time for the gripping member 10 to move away from the bottle before the latter starts to swing from off the turntable. As the rest 8 is of substantial width peripherally of the bottle, its outer corner (that is the corner nearest to the conveyor 11) travels faster than the axis of the bottle. To prevent this outer corner of the rest from catching up with the bottle as the latter is swung bodily about the center of shaft 63 during transfer, the arm 51 must move at a much greater velocity (when it first contacts the bottle) than that of the table.

Since motion of the bottle, in swinging away from the table and over onto the conveyor, is no longer about the axis of the table, the component of the bottle's velocity about the axis of the table (as soon as transfer actually begins) is much less than its original velocity about the center of the table, and thus, for this reason also, a high speed of the arm 51 is required to prevent the rest 8 from striking the bottle during this transfer.

However, to prevent the arm 51 from pushing the bottle ahead after the latter has been placed on the conveyor 11 and the arm 51 again picks up speed preparatory to engagement with the next bottle on the turntable, the chain 11 must travel at a rate substantially greater than the delivery speed of the arm 51.

The pin 53 about which jaw 55 swings is so located that immediately the arm 55 contacts the bottle and during the aforesaid quarter-inch travel of the bottle while clamped by jaw 55 against rest 8, there is no relative movement of the tip of the jaw 55 and the bottle, thus avoiding any possible injury to the label.

By way of example, but without limitation, ratios of speeds whereby the transfer mechanism is enabled to operate properly with bottles of different sizes, are as follows:

If the article travels in its arcuate path about the axis of the turntable at a linear velocity of 16 inches per second, the arm 51 should move at a rate of 29 inches per second when it first contacts the bottle. When the bottle is released by the arm 55 to travel with the conveyor 11, the arm 51 should then be moving at approximately 9 inches per second while the chain should be moving at approximately 13½ inches per second.

To the outer peripheral surface of the segmental portion 64 of shaft 41 there is secured by bolts N (Fig. 3) the hub portion of a second article-engaging arm 150, which may be identically similar to the arm 50, and comprising upper and lower article-engaging members 151 and 152 (Fig. 2) corresponding to the members 51 and 52 of the arm 50 above described. With this second article-engaging arm there is also associated an article-clamping jaw 155 (Fig. 1) similar to the jaw 55 above described, and actuated by a spring P' and a cam follower roll 61ª which also engages the fixed cam 62.

Figure 14:
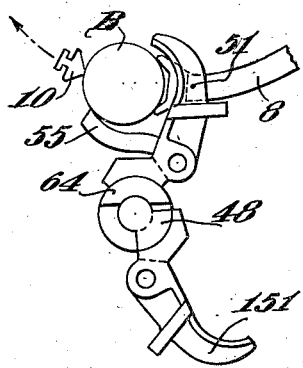
Figure 15:
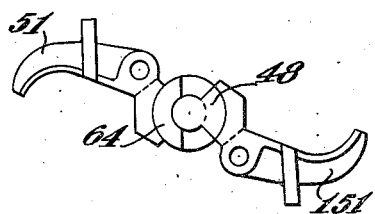
Figure 12:
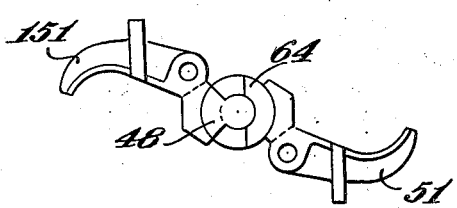
Figure 16:
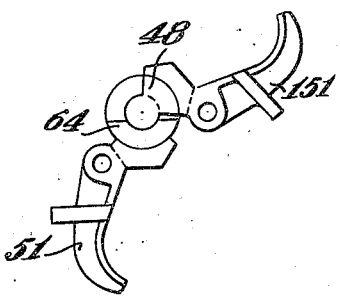
Figure 13:
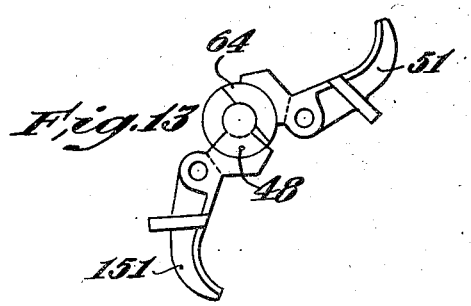

In the operation of the machine, and assuming that the table-supporting shaft 4 is being constantly driven at uniform angular velocity, and that the conveyor belt 11 is moving at a uniform linear velocity substantially less than the linear velocity of bottles moving along on the table 7, the engagement of pinion 19 with gear 20 will turn the gear 26 at a uniform velocity, dependent upon the gear ratio. As this latter gear 26 rotates, the rolls 39 and 46 (which constitute anti-friction crank pins) cause the actuating arms 37 and 44 to swing about the axis of shaft 33, but since the axis of the shaft 27 is eccentric to the axes of the shafts 33 and 41, the crank pins 39 and 46 travel in and out radially along the guide slots 38 and 45 which results in a variable speed of rotation of the shafts 33 and 41. The varying positions of the rolls 39 and 46 relative to the arms 37 and 44 are illustrated in Fig. 11. The resultant relative movements of the two article-engaging arms 51 and 151 are indicated in Figs. 12, 13, 14, 15 and 16, respectively. As one of the arms, for example the arm 51, approaches the path of the articles on the rotating table 7, the angular velocity of the arm 51 is increased until it somewhat exceeds the linear velocity of the article on the table 7. As the arm 51 approaches the article on the table the corresponding clamping arm or jaw 55 is retracted from the arm 51 by cam 62 so as to permit the article to be received between the arm 51 and the gripping jaw. However, as soon as the article is disposed between the jaw 55 and the arm 51, the jaw 55 is permitted by the cam to be closed by spring P, thus firmly clamping the article against rest 8 (Fig. 14). Immediately thereafter the gripping member 10 retracts from the article to give clearance for the article to swing off of the table. The arm 51 now engages the article, which is thus seized between arms 55 and 51 which now act as a unit to sweep the article from off the table, with the article gripped between them. When the arm 51 has traveled substantially 180° the article is disposed directly above the upper run of the conveyor belt 11. During this arc of travel, the speed of the arm 51 (and the cooperating arm 55) is gradually decreased until, when the article is above the conveyor belt 11, the linear velocity of the article is substantially less than its initial velocity of travel with the table. At this time the cam 62 causes the arm or jaw 55 to be retracted from the arm 51, thus releasing the article and permitting it to be moved freely along on the conveyor belt. At the instant of release, the speed of the arm 51 is substantially less than that of the conveyor belt, so that the article will tend to move away from the arm 51 as the latter continues to advance. Soon after the article has been freed from the arm 51, the angular velocity of the arm 51 begins to increase but before it can catch up with the article on the belt, the article has passed beyond its orbit. While the first arm 51 has thus been completing its cycle, the opposite arm 151 has begun its similar cycle of motion, has picked up the succeeding article from the table, and is moving it toward the conveyor belt. Thus the articles are swept rapidly from the table 7, reduced in velocity, and deposited one after another upon the conveyor belt, the arms 51 and 151 following each other in their circular path of travel, first receding from each other and then catching up with each other as they continue to rotate.

While one desirable embodiment of the invention has been disclosed by way of example, it is to be understood that the invention is broadly inclusive of all equivalent constructions, and further, that while the transfer mechanism is here illustrated as designed for reducing the speed of an article when transferring it from one conveyor element to another, it may be arranged, if desired, to pick up an article from a slow moving conveyor and to increase its speed in readiness for delivery to a fast moving conveyor.

I claim:

1. Conveyor apparatus of the kind which includes a rotary turntable and a rectilinearly moving conveyor substantially tangent to the periphery of the table, the table having thereon a rear, article-positioning rest and a forward, relatively movable gripper for holding the article against the rest, transfer means for shifting the article from the table to the conveyor, and means for moving the gripper away from the rest as the article nears the transfer point thereby to release the article, characterized in that the transfer means comprises a clamping element operative temporarily to clamp the article against the rest while the gripper moves away from the article in releasing the latter for transfer, and means which engages the article, only after the gripper has receded from the article, to release the latter, and which cooperates with the clamping element to clasp and hold the article while the article is being shifted from the table to the conveyor.

2. A conveyor apparatus of the kind which includes a rotary turntable and a rectilinearly moving conveyor, the table having thereon a rear, article-positioning rest and a forward, relatively movable gripper for holding the article against the rest, transfer means for shifting the article from the table to the conveyor, and means for moving the gripper away from the rest as the article nears the transfer point thereby to release the article, characterized in that the transfer means comprises an element operative temporarily to hold the article against the rest while the gripper is moving away from the article, and a second element cooperable with said first element, after the gripper has receded from the article, to grasp and to hold the article between them while shifting the article bodily from the table to the conveyor.

3. Conveyor apparatus of the kind which includes a rotary turntable and a moving conveyor substantially tangent to the periphery of the table, the table having thereon a rear, article-positioning rest and a forward, relatively movable gripper for holding the article against the rest, transfer means for shifting the article from the table to the conveyor, and means for moving the gripper away from the rest as the article nears the transfer point thereby to release the article, characterized in that the transfer means comprises a clamping jaw which engages and holds the article against the rest as the article nears the transfer point and while the gripper is moving away from the article preparatory to transfer, a part which cooperates with the clamping jaw to seize the article and shift it bodily from the table to the conveyor, and means for supporting and moving said latter part comprising a vertical driven shaft carrying said part, a vertical stub shaft eccentric with respect to the axis of the driven shaft, a gear free to turn on the stub shaft, a crank pin mounted on the gear, a radially slotted actuating arm fixed to the driven shaft, the crank pin engaging the slot in said arm, and means for driving the gear.

4. Conveyor apparatus of the kind which includes a rotary turntable and a conveyor, the table having thereon a rear, article-positioning rest and a forward, relatively movable gripper for holding the article against the rest, transfer means for shifting the article from the table to the conveyor, means for moving the gripper away from the rest as the article nears the transfer point thereby to release the article, characterized in that the transfer means comprises a pair of cooperable jaws one pivotally supported by the second and which are designed to seize the article between them and to shift it bodily from the table to the conveyor, means operative to move the first jaw into engagement with the article on the table thereby to hold the article against the rear rest while the gripper retreats from the article, preparatory to transfer, and drive means operative to move both jaws with the article held between them so as to shift the article from the table to the conveyor, said drive means comprising a vertical driven shaft carrying said second jaw, a stub shaft parallel with and eccentric to the driven shaft, a gear free to turn on the stub shaft, a crank pin carried by the gear, an actuating arm fixed to the driven shaft, said actuating arm having an elongate slot which receives the crank pin, and means for rotating the gear in timed relation to the table, the parts being so designed and arranged as to initiate the shifting of the article at a substantially greater linear speed than its normal speed of travel with the table.

5. Conveyor apparatus of the kind which includes a rotary turntable and a moving conveyor, the table having thereon a rear, article-positioning rest and a forward, relatively movable gripper for holding the article against the rest, transfer means for shifting the article from the table to the conveyor, means for moving the gripper away from the rest as the article nears the transfer point thereby to release the article, characterized in that the transfer means comprises a pair of cooperable jaws one pivotally supported by the second and which are designed to seize the article between them and to shift it bodily from the table to the conveyor, means operative to move one jaw only into engagement with the article on the table thereby to hold the article against the rear rest while the gripper retreats from the article, preparatory to transfer, means operative thereafter to move the other jaw into engagement with the article thereby to clamp the article against the first-named jaw and drive means operative to move both jaws bodily with the article held between them, thereby to shift the article to the conveyor, said drive means being so constructed and arranged as to deliver the article to the conveyor at a linear speed less than that of the conveyor.

6. Apparatus wherein two conveyor elements move at different linear velocities respectively, and wherein transfer means automatically shifts articles supported by the conveyor element of greater velocity to the conveyor element of lesser velocity, characterized in that the transfer means comprises a plurality of article-engaging parts each arranged to travel in a closed orbital path, portions of which substantially register with portions of the paths of articles carried by the respective conveyor elements, and means for moving said article-engaging parts in succession along their orbital paths, said means comprising a pair of coaxial driven shafts one being tubular and housing the other, each shaft having fixed to it, adjacent to its lower end, an actuated arm having an elongate radial slot, a gear turning about an axis eccentric to the axis of said driven shafts, crank pins mounted on the gear, said pins being spaced circumferentially of the gear and each engaging the slot in one of the actuating arms respectfully, and means for securing one of said article-engaging parts to each of said driven shafts respectively, the parts being so constructed and arranged as to move each article-engaging part at varying relative velocities, the velocity of each article-engaging part exceeding that of the conveyor element from which the article is removed while in registry with said element, and being less at the delivery point than that of the conveyor element to which the article is transferred.

7. Apparatus wherein two conveyor elements move at different linear velocities respectively, and wherein transfer means automatically shifts articles supported by one of the conveyor elements to the other, characterized in that the transfer means comprises a plurality of article-engaging parts arranged to travel in circular coaxial orbits, portions of each orbit registering with portions of the path of the respective conveyor elements, means for driving the article-engaging parts at relatively different angular velocities, said drive means comprising a pair of coaxial driven shafts, one of said shafts being tubular and housing the other, the upper part of the tubular shaft being segmental and of a peripheral extent less than 180°, the inner driven shaft having a radial projection of approximately 45° circumferential extent, means operative to rotate the driven shafts at variable angular velocities, and means connecting one of said article-engaging parts to the segmental portion of the tubular shaft and for connecting the other of said article-engaging parts to the radial projection of the inner driven shaft, the parts being so constructed and arranged as to impart to each article-engaging part a linear velocity different from that of the conveyor element with which said article-engaging part for the time being registers.

8. Apparatus wherein two conveyor elements move at different linear velocities respectively, and wherein transfer means automatically shifts articles supported by one of the conveyor elements to the other, characterized in that the transfer means comprises a plurality of article-engaging arms arranged to swing about the same axis and across portions of the paths of the two conveyor elements respectively, and drive means for turning each arm, the drive means comprising a pair of crank pins spaced approximately 180° apart and turning about a common axis eccentric to the axis about which said article-engaging arms swing, said crank pins engaging elongate slots in a pair of relatively movable members mounted to turn about the axis of rotation of said article-engaging arms, and means for transmitting motion from said slotted members to the respective arms, the parts being constructed and arranged to move the arms in succession and at varying angular velocities, the velocity of each arm differing from that of the respective conveyor over which it swings at any given time.

9. Apparatus wherein two conveyor elements move at different linear velocities respectively, in substantially the same plane and wherein transfer means automatically shifts articles supported by one of the conveyor elements to the other, characterized in that the transfer means comprises a pair of coaxial driven shafts each carrying an article-engaging part arranged to sweep across one of the conveyor elements and to shift articles therefrom to the other conveyor element, each of said driven shafts having fixed thereto a rigid actuating arm, a drive shaft parallel with but eccentric to the driven shafts, means carried by the drive shaft for supporting a pair of crank pins which are spaced apart angularly, each crank pin engaging a guide element on one of the actuating arms respectively, and means for rotating the drive shaft.

10. Apparatus wherein two conveyor elements move at different linear velocities respectively, in substantially the same plane and wherein transfer means automatically shifts articles supported by one of the conveyor elements to the other, characterized in that the transfer means comprises a pair of coaxial driven shafts each having fixed thereto a rigid article-engaging arm, said arms being disposed in substantially the same plane and arranged to sweep articles from one of the conveyor elements to the other as the arms rotate, each of the driven shafts having fixed to it a rigid actuating arm provided with a radially extending elongate guide element, a drive shaft parallel with but eccentric to the driven shafts, said drive shaft carrying a pair of diametrically opposite crank arms, each crank arm having a crank pin which engages the guide element of one of the respective actuating arms, and means for turning the drive shaft.

11. Apparatus wherein a rotary table and a conveyor belt, substantially tangent to the table, are disposed in substantially the same plane and constitute conveyor elements and wherein means is provided for turning the table and for moving the belt in timed relation, and wherein transfer means automatically shifts articles supported by the table onto the belt, characterized in that the transfer means comprises a pair of coaxial driven shafts parallel to the axis of the table, each shaft having an article-engaging arm operative, as its shaft turns, to sweep an article from the table onto the belt, each shaft having a rigid actuating arm, each actuating arm being provided with an elongate radial guide element, a drive shaft whose axis is parallel with but eccentric to the driven shafts, said drive shaft carrying a disk provided with a pair of diametrically opposite crank members, said crank members engaging the guide elements of the respective actuating arms, and means for turning the drive shaft in timed relation to the turning of the table.

12. Apparatus wherein a rotary table and a conveyor belt, substantially tangent to the table, are disposed in substantially the same plane and constitute conveyor elements and wherein means is provided for turning the table and for moving the belt in timed relation, and wherein transfer means automatically shifts articles supported by the table onto the belt, characterized in that the transfer means comprises a pair of coaxial driven shafts, the inner shaft having a segmental projection and the outer shaft having a segmental sleeve portion, the angular extents of said projection and sleeve portion being such as to permit substantial relative rotation of the shafts, rigid article-engaging arms secured to the projection and segmental sleeve portion, respectively, said arms being disposed in substantially the same plane and so designed that, as their respective shafts rotate, the arms successively sweep across the table so as to shift articles resting thereon over onto the belt, each driven shaft having a rigid actuating arm each provided with an elongate radial guide slot, a drive shaft parallel with but eccentric to the driven shafts, said drive shaft carrying a pair of diametrically opposite crank members which engage the guide slots in the respective actuating arms, and means for turning the drive shaft in timed relation to the turning of the table.

13. Apparatus wherein a rotary table and a conveyor belt, substantially tangent to the table, are disposed in substantially the same plane and constitute conveyor elements and wherein means is provided for turning the table and for moving the belt in timed relation, and wherein transfer means automatically shifts articles supported by the table onto the belt, characterized in that the transfer means comprises a pair of coaxial driven shafts, the inner shaft having a segmental projection of approximately 45° circumferential extent and the outer shaft having a segmental sleeve portion of approximately 140° circumferential extent, rigid article-engaging arms secured to the segmental projection and the segmental sleeve portion respectively, said arms being disposed in substantially the same plane and so arranged that as their respective shafts rotate the arms successively sweep across the table so as to shift articles from the table to the belt, each shaft having fixed thereto a rigid actuating arm provided with an elongate radial guide slot, a drive shaft parallel with but eccentric to the driven shafts, the drive shaft having fixed thereto diametrically opposed crank pins, said pins being at equal radial distances from the axis of the drive shafts and engaging the slots in the respective actuating arms, and means for turning the drive shaft in timed relation to the table.

14. Apparatus wherein two conveyer elements move at different linear velocities respectively, and wherein relatively movable holding members normally confine an article carried by the first of said conveyor elements, and transfer means automatically shifts articles supported by one of the conveyor elements to the other, characterized in that the transfer means comprises an article-engaging arm arranged to sweep across one of said conveyor elements and to shift articles from the latter to the other conveyor element, a rotary shaft to which said arm is secured, a gripper jaw pivotally connected with the article-engaging arm and cooperable with the latter to grip the article, means for moving the arm and gripper jaw as a unit while gripping the article between them thereby to transfer the article from one conveyor element to the other, said means for so moving the arm and gripper jaw comprising a shaft to which the arm is fixed, variable speed mechanism operative to turn the shaft and thereby at different times to impart bodily movement to the article-engaging arm at linear speeds substantially corresponding to those of the respective conveyor elements, means operative to move one of the article-holding members away from the other as the article approaches the transfer position, a spring which causes the gripper jaw temporarily to clamp the article against the other of said article-holding members during the recession of the first of said article-holding members from the other, the article-engaging arm then being moved by the shaft to clamp the article against the gripper jaw, and cam means operative as the shaft turns to move the gripper jaw away from the article-engaging arm thereby to release the article.

15. Apparatus wherein two conveyor elements move at different linear velocities respectively, and wherein relatively movable holding members normally confine an article carried by the first of said conveyor elements, and transfer means automatically shifts articles supported by one of the conveyor elements to the other, characterized in that the transfer means comprises an article-engaging arm having vertically spaced article-contacting members, a gripper jaw pivotally connected to the arm and arranged to swing in a horizontal plane substantially midway between the planes of movement of said article-contacting members and cooperable with the latter to grip an article, means for moving the arm and gripper jaw as a unit in an arcuate path while gripping the article between them thereby to transfer the article from one conveyor element to the other, the means for so moving the arm and gripper jaw comprising a vertical shaft to which the arm is fixed, variable speed mechanism operative to turn the shaft and thereby at different times to impart bodily movement to the article-engaging arm at linear speeds substantially corresponding to those of the two conveyor elements respectively, means operative to move one of the article-holding members away from the other as the article approaches the transfer position while carried by the first of said conveyor elements, a spring which causes the gripper jaw temporarily to clamp the article against the other of said article-holding members during the recession of the first of said members from the article, the article-engaging arm then being moved by its shaft to clamp the article against the gripper jaw, and a stationary cam operative as the shaft turns to move the gripper jaw away from the article-engaging arm thereby to release the article.

16. In combination in apparatus of the kind wherein articles are transferred from a conveyor moving at one linear velocity to a second conveyor moving at a different linear velocity and wherein articles carried by one conveyor approach the transfer point while held between a rear rest fixed relatively to the conveyor and a forward grip member which is movable away from the rear rest to release the article, means for so moving said grip member as the article approaches the transfer point, and transfer means comprising an article-propelling arm which moves in a path such as to propel an article from one conveyor to the other and a gripper jaw cooperable at times with said arm to clamp an article between them, in combination, means operative to engage the gripper jaw with the article thereby to press the article against the rear rest while the forward grip member is being retracted from the article, and means operative thereafter to engage the article-propelling arm with the article and to move said arm and gripper jaw as a unit with the article clamped between them.

17. Apparatus according to claim 16 wherein the first conveyor moves the article in a circular path and the second conveyor moves the article in a rectilinear path parallel to a tangent to said circular path, the article-propelling arm moving in an arcuate path about an axis located between the periphery of said curved path and the proximate bound of the rectilinear path.

SIDNEY T. CARTER.

REFERENCES CITED

The following references are of record in the file of this patent:

UNITED STATES PATENTS

| Number | Name | Date |
|---|---|---|
| 523,013 | Smallwood | July 17, 1894 |
| 1,197,569 | Woodland | Sept. 5, 1916 |
| 1,245,730 | Johnson | Nov. 6, 1917 |
| 1,246,006 | Stake | Nov. 6, 1917 |
| 1,300,406 | Johnson | Apr. 15, 1919 |
| 1,336,028 | Fentress | Apr. 6, 1920 |
| 1,581,201 | Guenther | Apr. 20, 1926 |
| 1,696,360 | Peyser | Dec. 25, 1928 |
| 1,712,907 | Stenhouse | May 14, 1929 |
| 1,998,093 | Oslund | Apr. 16, 1935 |
| 2,026,811 | Bach | Jan. 7, 1936 |
| 2,371,748 | Fedorchak | Mar. 20, 1945 |